United States Patent
Wu et al.

(10) Patent No.: US 8,358,398 B2
(45) Date of Patent: Jan. 22, 2013

(54) SINGLE CONTROL LIQUID CRYSTAL OPTICAL SWITCH AND ATTENUATOR

(75) Inventors: Xuehua Wu, Union City, CA (US);
Haijun Yuan, Pleasanton, CA (US);
Christopher Lin, El Cerrito, CA (US);
Giovanni Barbarossa, Saratoga, CA (US)

(73) Assignee: Oclaro (North America), Inc., San Jose, CA (US)

( * ) Notice: Subject to any disclaimer, the term of this patent is extended or adjusted under 35 U.S.C. 154(b) by 942 days.

(21) Appl. No.: 12/356,038

(22) Filed: Jan. 19, 2009

(65) Prior Publication Data
US 2009/0147212 A1 Jun. 11, 2009

Related U.S. Application Data

(63) Continuation-in-part of application No. 12/014,730, filed on Jan. 15, 2008.

(60) Provisional application No. 60/893,872, filed on Mar. 8, 2007.

(51) Int. Cl.
*G02F 1/13* (2006.01)
*G02F 1/1335* (2006.01)
*G02B 27/28* (2006.01)

(52) U.S. Cl. ...... 349/193; 349/96; 349/117; 359/489.08

(58) Field of Classification Search ........... 349/96, 349/117, 193, 196; 385/16, 18, 22; 359/320, 359/484.06, 487.04, 489.04, 489.08, 489.15
See application file for complete search history.

(56) References Cited

U.S. PATENT DOCUMENTS

| | | | |
|---|---|---|---|
| 7,333,686 B1 | 2/2008 | Barbarossa et al. | |
| 2006/0215263 A1* | 9/2006 | Mi et al. | 359/486 |
| 2008/0260390 A1* | 10/2008 | Barbarossa | 398/139 |

OTHER PUBLICATIONS

International Search Report and Written Opinion dated Mar. 23, 2010, International Application No. PCT/US2010/021369.

* cited by examiner

*Primary Examiner* — Uyen Chau N Le
*Assistant Examiner* — Michael Mooney
(74) *Attorney, Agent, or Firm* — Fenwick & West LLP

(57) ABSTRACT

An optical device is configured to perform both switching and attenuation of an optical beam in response to a single control signal. The optical device includes a liquid-crystal-based beam-polarizing element having polarization-conditioning regions that are controlled using a common electrode. The first polarization-conditioning region conditions the polarization of the input beam in order to separate the input beam into a primary component and a residual component. The second and third polarization-conditioning regions change the polarization of the primary component and the residual component, respectively. The primary component is directed to an output port after it has been attenuated based on its polarization state. The residual component, after passing through the third polarization-conditioning region, has its intensity further reduced based on its polarization state.

14 Claims, 4 Drawing Sheets

SINGLE CONTROL LIQUID CRYSTAL OPTICAL SWITCH AND ATTENUATOR

CROSS-REFERENCE TO RELATED APPLICATIONS

This application is a continuation-in-part of U.S. patent application Ser. No. 12/014,730, filed Jan. 15, 2008, entitled "High Extinction Ratio Liquid Crystal Optical Switch," which claims the benefit of U.S. Provisional Patent Application Ser. No. 60/893,872, filed Mar. 8, 2007, entitled "Wavelength Selective Liquid Crystal Switch." The entire contents of both applications are incorporated by reference herein.

BACKGROUND OF THE INVENTION

1. Field of the Invention

Embodiments of the present invention relate generally to optical communication systems and components and, more particularly, to a liquid crystal-based optical switch and attenuator.

2. Description of the Related Art

In optical communication systems, it is sometimes necessary to perform 1×2 switching of an optical signal, where an input light beam enters an optical switching device through an input fiber and is directed to one of two output fibers. There are also more complicated optical switches, such as 2×2, 1×N, and N×N optical switches, which are realized by combining several 1×2 optical switches.

In addition to routing of signals by optical switches, attenuation of signals in optical communication systems is also advantageous, for example in an optical communication system that employs wavelength division multiplexing (WDM). In such an optical system, information is carried by multiple channels, each channel having a unique wavelength. WDM allows transmission of data from different sources over the same fiber optic link simultaneously, since each data source is assigned a dedicated channel. The result is an optical communication link with an aggregate bandwidth that increases with the number of wavelengths, or channels, incorporated into the WDM signal. In this way, WDM technology maximizes the use of an available fiber optic infrastructure, such that what would normally require multiple optic links or fibers instead requires only one.

In practice, different wavelength channels of a WDM signal typically undergo asymmetrical losses as they travel through an optical communication system, resulting in unequal intensities for each channel. Because these unequal intensities can compromise the integrity of the information carried by the WDM signal, an optical device or array of optical devices is typically used in WDM systems to perform wavelength-independent attenuation.

While switching and attenuation of optical signals are known in the art, each of these operations is performed by a different optical device. The use of an optical device to perform switching and another device to perform attenuation in an optical communication system increases the size and complexity of the system, makes erosion of signal quality more likely due to misalignment of the optical devices, and requires a first independent control signal to complete the switching function and a second independent control signal to complete the attenuation function. Accordingly, there is a need in the art for an optical switch for use in an optical network capable of performing both switching and attenuation of an optical signal.

SUMMARY OF THE INVENTION

Embodiments of the present invention provide an optical device for performing both switching and attenuation of an optical signal. The optical device includes a liquid crystal-based beam-polarizing element having multiple polarization-conditioning regions that are controlled by a single control signal.

According to one embodiment, an optical device for performing both switching and attenuation of an input beam includes a liquid crystal (LC) structure that is disposed in an optical path of an input beam and optical paths of output beams generated from the input beam, and a beam polarization separator disposed in the optical path of the input beam and configured to generate the output beams from the input beam based on a polarization state of the input beam. The LC structure has a first light-conditioning LC region positioned in the optical path of the input beam, a second light-conditioning LC region positioned in an optical path of a first output beam, a third light-conditioning LC region positioned in an optical path of a second output beam, and a control electrode that can be controlled to be set at one of multiple voltage levels and is arranged to apply the same voltage to the first, second and third light-conditioning LC regions.

According to another embodiment of the invention, a wavelength selective switch comprises a wavelength dispersive element for separating an input beam into its wavelength components, an array of liquid crystal structures for conditioning the polarization state of incident light, and a beam polarization separator disposed in an optical path of the input beam and configured to generate output beams from each of the wavelength components of the input beam based on a polarization state of the wavelength components. Each LC structure has a first light-conditioning LC region positioned in the optical path of one of the wavelength components, a second light-conditioning LC region positioned in an optical path of a first output beam, a third light-conditioning LC region positioned in an optical path of a second output beam, and a control electrode that can be controlled to be set at one of multiple voltage levels and is arranged to apply the same voltage to the first, second and third light-conditioning LC regions.

Embodiments of the present invention also provide a method for switching and attenuating an input beam using an optical device having at least one input port, multiple output ports, multiple loss ports, and an LC structure having multiple light-conditioning LC regions for conditioning the polarization state of incident light and a common electrode that can be controlled to be set at one of multiple voltage levels and is arranged to apply the same voltage to each of the light-conditioning LC regions. The method includes the steps of passing the input beam through a first one of said light-conditioning LC regions of the LC structure and changing a polarization state of the input beam, directing a primary component of the input beam along a first optical path and a residual component of the input beam along a second optical path based on the polarization state of the input beam, passing the primary component of the input beam through a second one of said light-conditioning LC regions of the LC structure and changing a polarization state of the primary component, and directing a first component of the primary component to an output port, wherein the first component of the primary component has a lower intensity that the primary component.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Embodiments of the invention contemplate an optical device that performs both switching and attenuation of an optical beam in response to a single control signal. The optical device includes a liquid-crystal-based beam-polarizing element having polarization-conditioning regions that are controlled using a common electrode. The first polarization-conditioning region conditions the polarization of the input beam in order to separate the input beam into a primary component and a residual component. The second and third polarization-conditioning regions change the polarization of the primary component and the residual component, respectively. The primary component is directed to an output port after it has been attenuated based on its polarization state. The residual component, after passing through the third polarization-conditioning region, has its intensity further reduced based on its polarization state.

Figure 1:
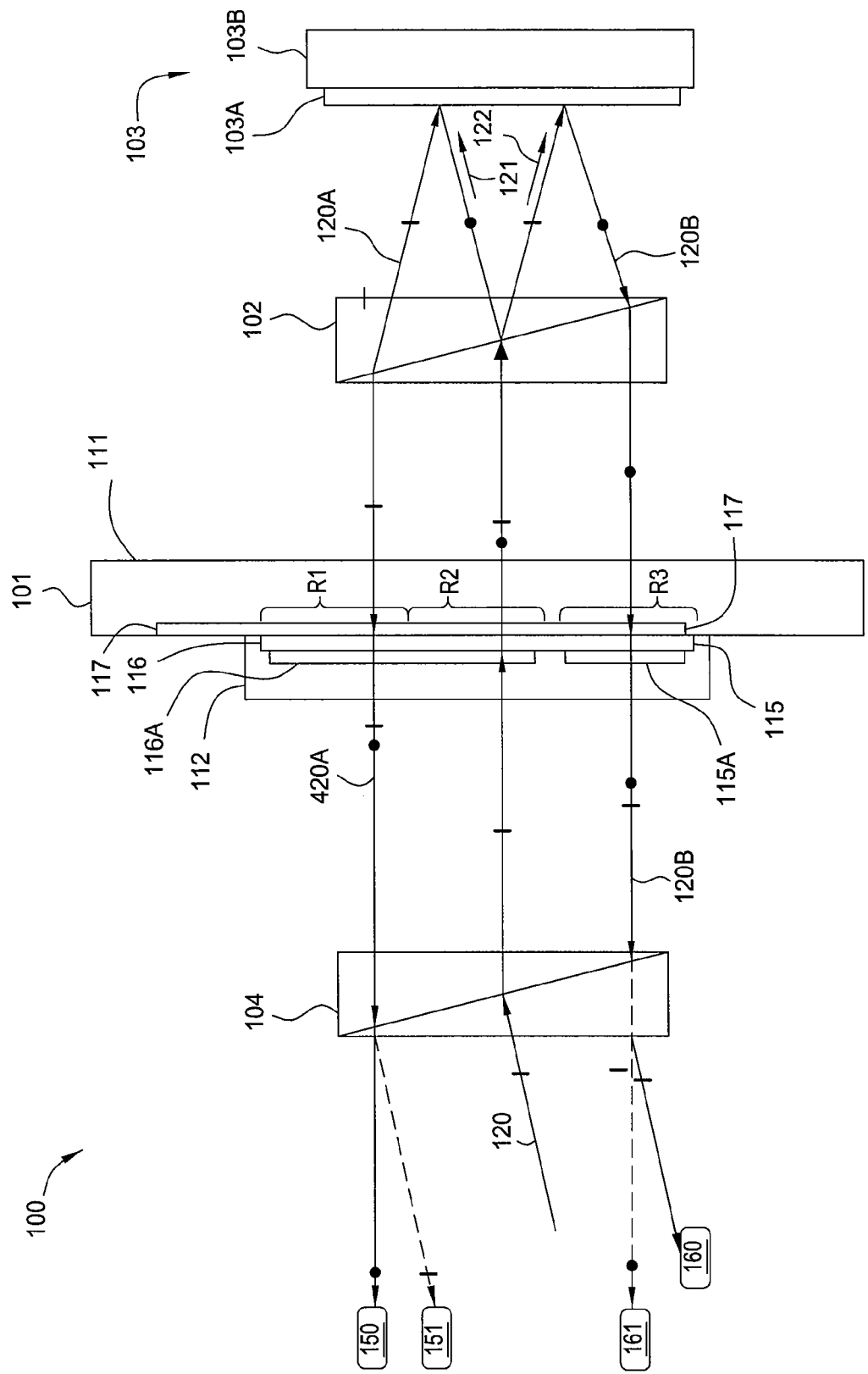
FIG. 1 schematically illustrates a cross-sectional view of an optical switching device that is configured to provide 1×2 switching and attenuation of an optical signal in response to a single control signal, according to an embodiment of the invention.

FIG. 1 schematically illustrates a cross-sectional view of an optical device 100 that is configured to provide 1×2 switching and attenuation of an optical signal in response to a single control signal, according to an embodiment of the invention. Optical device 100 includes an LC beam-polarizing element 101, a first beam polarization separator 102, an optical redirection system 103, and a second beam polarization separator 104, all of which are optically coupled as shown for the treatment, i.e., the switching and attenuation, of an input beam 120.

LC beam-polarizing element 101 includes an LC structure that has two transparent plates 111, 112, which are laminated together to form LC cavities 115, 116 using techniques commonly known in the art. LC cavities 115, 116 contain an LC material, such as twisted nematic (TN) mode material, electrically controlled birefringence (ECB) mode material, etc. LC beam-polarizing element 101 also includes transparent electrodes that apply a potential difference across each of LC cavities 115, 116, thereby turning LCs contained therein "off" or "on," i.e., setting each LC to either modulate or not modulate the polarity of incident light. The transparent electrodes include a single vertical control electrode 117 and two horizontal electrodes 115A and 116A, and may be patterned from indium-tin oxide (ITO) layers. The transparent electrodes are covered with a buffered polyimide layer that determines LC configuration. Horizontal electrodes 115A, 116A, are formed on a surface of transparent plate 112, and are positioned adjacent LC cavities 115, 116, respectively, as shown. Similarly, vertical control electrode 117 is formed on a surface of transparent plate 111 and is positioned adjacent to both of LC cavities 115, 116. LC cavity 116 includes two conditioning regions, R1 and R2, and LC cavity 115 includes one conditioning region R3. By conditioning the polarization state of incident light, conditioning regions R1, R2, and R3 in LC beam-polarizing element 101 enable optical device 100 to perform both 1×2 switching and attenuation of input beam 120 with only a single independent control signal and LC structure, as described below.

First and second beam polarization separators 102, 104 serve as steering optics for LC beam-polarizing element 101 by directing incident light along either of two optical paths based on the polarization state of the incident light, i.e., s- or p-polarized. When an incident light beam includes both s- and p-polarized light, a portion of the incident light beam is directed along each optical path. Specifically, the s-polarized component of the incident light beam is directed along one optical path and the p-polarized component is directed along the other optical path. In the example illustrated in FIG. 1, first and second beam polarization separators 102, 104 are Wollaston prisms, which angularly deflect light beams at different angles depending on their orthogonal polarization states. In another example, first and second beam polarization separators 102, 104 may be birefringent crystals, such as a $YVO_4$ crystal, which translationally deflect incident light beams by different amounts based on orthogonal polarization states. In one embodiment, second beam polarization separator 104 is an absorptive polarizer, such as a linear polarizer. In such an embodiment, an output light beam is attenuated when second beam polarization separator 104 absorbs unwanted optical energy, rather than direct the unwanted optical energy along a different optical path. In this way, the residual component of an attenuated light beam, i.e., the component of a light beam that consists of unwanted optical energy, can be selectively removed prior to entering an output port even though the residual component is directed along the same optical path as the component of the light beam to be output by optical device 100.

Optical redirection system 103 is configured to redirect incident light that has passed through LC beam-polarizing element 101 and first beam polarization separator 102 back through these same optical components. In the example illustrated in FIG. 1, optical redirection system 103 includes a quarter wave plate 103A mounted on a mirror 103B, where mirror 103B reflects incident light as shown, and quarter wave plate 103A rotates the polarization of incident light by 90°. Other configurations of mirrors, prisms, and/or lenses can be devised by one of skill in the art to serve the same function. In one embodiment, quarter wave plate 103A is omitted from optical redirection system 103, and the electrode-biasing scheme for LC beam-polarizing element 101, detailed below in Table 1, is modified accordingly.

In operation, optical device 100 performs 1×2 switching and attenuation on a linearly polarized input beam, i.e., input beam 120, in response to a single control signal. 1×2 switching of input beam 120 between output ports 150 and 160 is accomplished by conditioning the polarization of input beam 120 with LC beam-polarizing element 101 to form an output beam, and directing the output beam through first beam polarization separator 102. First beam polarization separator 102 then directs the output beam along an optical output path to either output port 150 or output port 160 based on the polarization state of the output beam. Attenuation of input beam 120 is accomplished by partially conditioning the polarization of input beam 120 with LC beam-polarizing element 101 to form an output beam and a residual component, redirecting the output beam through LC beam-polarizing element 101 a second time to complete the conditioning of the output beam polarization, and then directing the output beam through second beam polarization separator 104. Second beam polarization separator 104 either absorbs the unwanted optical energy of the output beam and the residual component or redirects the unwanted optical energy of the output beam and the residual component along optical paths that do not lead to an output port. The 1×2 switching and attenuation functions are described in detail below.

Initially, beam 120 passes through second beam polarization separator 104 and is directed through conditioning region R2 of the LC contained in LC cavity 116 as shown. Input beam 120 is a beam of s- or p-polarized light. In the example shown in FIG. 1, input beam 120 is p-polarized (denoted by a vertical bar). Because input beam 120 contains only p-polarized light, the entire beam is directed to conditioning region R2 and is not split by second beam polarization separator 104. The polarization of input beam 120 is adjusted by the LC contained in conditioning region R2 of LC cavity 116 so that the beam is ultimately directed to either output port 150 or 160, as desired, and attenuated to a target intensity level. After passing through conditioning region R2, first beam polarization separator 102 directs input beam 120 to optical redirection system 103 along an upper optical path 121 or a lower optical path 122, based on the polarization state of input beam 120. When input beam 120 requires attenuation, a portion of input beam 120 is directed along each of upper optical path 121 and lower optical path 122. The portion of beam 120 that follows optical path 121 is directed back to first beam polarization separator 102 as an outgoing beam 120A. Similarly, the portion of beam 120 that follows optical path 122 is directed back to first beam polarization separator 102 as an outgoing beam 120B. Outgoing beams 120A, 120B are then directed back through LC beam-polarizing element 101 and are conditioned so that second beam polarization separator 104 directs outgoing beam 120A to output port 150 and/or loss port 151, and output beam 120B to output port 160 and/or loss port 161, as desired. Outgoing beam 120A is directed through conditioning region R1 of the LC contained in LC cavity 116 and outgoing beam 120B is directed through conditioning region R3 of the LC contained in LC cavity 115. An electrode-biasing scheme for achieving 1×2 switching and attenuation by varying a single control signal applied to vertical control electrode 117 is described in detail below in conjunction with Table 1.

Table 1 summarizes one electrode-biasing scheme for LC beam-polarizing element 101, by which input beam 120 may be switched between output ports 150, 160, loss ports 151, 161, and/or be attenuated as desired by varying a single control signal, according to embodiments of the invention. In accordance with this biasing scheme, a first bias is applied to horizontal electrode 115A, a second bias of opposite polarity is applied to horizontal electrode 116A, and a third bias is applied to vertical control electrode 117, where the third bias is the control signal and may range in value between the first and second biases as desired for vertical control electrode 117. The LC material disposed in LC cavities 115, 116 form LC "pixels", where the potential difference developed between adjacent electrodes determines the manner in which each LC pixel conditions an incident beam of linearly polarized light. Thus, the potential difference developed between vertical control electrode 117 and horizontal electrode 115A determines the polarizing effect of the LC pixel in LC beam-polarizing element 101 that coincides with conditioning region R3. Similarly, the potential difference between vertical control electrode 117 and horizontal electrode 116A determines the polarizing effect of the LC pixel that coincides with conditioning regions R1 and R2. For an LC pixel containing a twisted nematic (TN) mode LC material, a potential difference thereacross of up to about 1.2 V converts the majority of linearly polarized light from s- to p-polarized and vice versa. An LC pixel having a potential difference thereacross of more than about 4.0 V converts essentially none of the polarization of an incident beam. And an LC pixel having a potential difference thereacross of between about 1.2 V to 4.0 V partially converts the polarization of incident light as a function of the potential difference.

Table 1 presents the resultant potential difference (in volts or V) produced across each of the three conditioning regions R1-R3 of LC beam-polarizing element 101 through which input beam 120 passes. The value of the resultant potential difference across each LC pixel is determined by cross-indexing the bias, in volts, applied to vertical control electrode 117 (given in Row 1 of Table 1) with the bias, in volts, applied to horizontal electrodes 115A and 116A (given in Column 1 of Table 1). In the example summarized by Table 1, a constant bias of +4 V is applied to conditioning regions R1 and R2 via horizontal electrode 116A, and a constant bias of −4 V is applied to conditioning region R3 by horizontal electrode 115A. The bias applied to vertical control electrode 117 may be varied between +4 V and −4 V.

TABLE 1

Resultant Potential Difference (in V) Across Conditioning Regions of LC beam-polarizing element 101

| | Bias on Vertical Electrode 117 → | | | | |
| --- | --- | --- | --- | --- | --- |
| | +4 | +2 | 0 | −2 | −4 |
| Bias on Region R1 | +4 | 0 | +2 | +4 | +6 | +8 |
| Bias on Region R2 | +4 | 0 | +2 | +4 | +6 | +8 |
| Bias on Region R3 | −4 | −8 | −6 | −4 | −2 | 0 |
| Output Port Status 160 | | BLOCKING | | ATTENUATING | |
| 150 | | ATTENUATING | | BLOCKING | |

Referring to Table 1, the resultant potential difference that may be produced across each LC pixel of LC beam-polarizing element 101 ranges from −8 V to +8 V. Therefore, the three conditioning regions R1-R3 of LC beam-polarizing element 101 may be set to fully or partially convert the polarization of incident light, or to allow incident light to pass through unconverted. As summarized in Rows 5 and 6 of Table 1, by varying the bias applied to vertical control electrode 117, input beam 120 may be fully or partially directed to optical output port 150, 160, or blocked, i.e., directed to loss port 151 or 161.

To illustrate, assume that LC beam-polarizing element 101 is set to direct input beam 120 to optical output port 150. Referring to FIG. 1, input beam 120 is initially p-polarized (denoted by the vertical line through the arrow representing input beam 120), and is directed through conditioning region R2 of LC cavity 116. In order to direct input beam 120 to output port 150, the LC pixel in region R2 must be set to convert input beam 120 to s-polarized light (denoted by a dot). For maximum conversion, a potential difference of zero V should be applied across the LC pixel in region R2. Because horizontal electrode 116A is maintained with a bias of +4 V, vertical control electrode 117 must also be set at +4 V. The majority of input beam 120, i.e., 0.1 to 0.01 dB, is then converted to s-polarized light, directed upward by first beam polarization separator 102, and directed to optical redirection system 103 via upper optical path 121. Input beam 120 interacts with optical redirection system 103 and is directed back to first beam polarization separator 102 as outgoing beam 120A, which is p-polarized after leaving optical redirection system 103. Such a change in polarization is caused by quarter wave plate 103A, which rotates the polarization of incident light by 90°. Optical redirection system 103 then directs outgoing beam 120A through conditioning region R1. For outgoing beam 120A to be directed to output port 150 by second beam polarization separator 104, the LC pixel in conditioning region R1 must convert outgoing beam 120A to s-polarized light. Consulting Table 1, the potential difference across conditioning region R1 is zero V, since horizontal electrode 116A is maintained with a bias of +4 V and vertical control electrode 117, in this example, is also +4 V. Thus, at zero V, the LC pixel in region R1 converts input beam 120 to s-polarized light, and outgoing beam 120A is ultimately directed to output port 150 via second beam polarization separator 104.

Through a similar process, LC beam-polarizing element 101 may direct input beam 120 to optical output port 160, in this case by setting vertical control electrode 117 to −4 V. Conditioning region R2, which is at a potential difference of +8 V, does not alter the polarization of input beam 120. Input beam 120 is directed to optical redirection system 103 along lower optical path 121, is redirected to conditioning region R3 as outgoing beam 120B, which has been s-polarized by quarter wave plate 103A. Because the potential difference across conditioning region R3 is 0 V, outgoing beam 120B is converted to p-polarized light, and is directed to output port 160. Further study of Table 1 and FIG. 1 reveals that when vertical control electrode 117 is set to 0 V, input beam 120 is directed to loss port 161, thereby blocking input beam 120 and directing the beam to neither output port 150 nor output port 160.

Attenuation of input beam 120 may also be carried out with the biasing scheme illustrated in this example by modulating the polarization of outgoing beams 120A, 120B with LC beam-polarizing element 101. To illustrate, input beam 120 may be directed to output port 150 and attenuated to a desired intensity. Vertical control electrode 117 is biased between about +1.2 V and +4.0 V, thereby producing a potential difference with horizontal electrode 116A of zero V to 2.8 V. Therefore, only a portion of the optical energy of input beam 120 is directed along upper optical path 121 to output port 150 via conditioning region R1, i.e., s-polarized outgoing beam 120A. A p-polarized residual component of input beam 120 that consists of the remainder of the optical energy of input beam 120, i.e., outgoing beam 120B, is directed along lower optical path 122 to loss port 151 via conditioning region R3. Outgoing beam 120A is changed to p-polarization by quarter wave plate 103A, then conditioning region R1 partially conditions the polarity of outgoing beam 120A to s-polarization, since vertical control electrode 117 is biased between about +1.2 V and +4.0 V, since the potential difference across conditioning region R1 is between 0 V and 4 V. Thus, when output beam 120A passes through second beam polarization separator 104, the portion of output beam 120A that is s-polarized is directed to output port 150. The unwanted optical energy of output beam 120A, i.e., the portion that is p-polarized after conditioning by conditioning region R1, is directed to loss port 151. As shown, the residual component of input beam 120, i.e., outgoing beam 120B, is prevented from entering output port 160 as follows. Outgoing beam 120B is initially p-polarized and is directed along lower optical path 122. Quarter wave plate 103A changes the polarization of outgoing beam 120B to s-polarized, and first beam polarization separator 102 directs outgoing beam 120B to conditioning region R3. Because vertical control electrode 117 is biased between about +1.2 V and +4.0 V and horizontal electrode 115A is biased at −4 V, the potential difference in conditioning region R3 is between 5.2 V and 8.0 V and conditioning region R3 does not change the polarization state of outgoing beam 120B. Thus, outgoing beam 120B remains s-polarized and second beam polarization separator 104 filters outgoing beam 120B or directs outgoing beam 120B to loss port 161. Consulting Table 1 and FIG. 1 reveals that input beam 120 may instead be directed to output port 160 and attenuated to a desired intensity by biasing vertical control electrode 117 between −1.2 V and −4.0 V.

Hence, the bias value of vertical control electrode 117 determines the portion of an outgoing beam that is attenuated, i.e., directed to a given loss port or conditioned to a different polarization state than is desired to enter an output port. In this way, 1×2 switching and attenuation of input beam 121 is controlled by a single control signal and is performed by a single (i.e., an uncascaded) LC structure. Such an arrangement reduces the size and complexity of an optical system performing the switching and attenuation functions. In addition, control of such a system is simplified, since only a single control signal is required to control both functions.

In the configuration of LC beam-polarizing element 101 illustrated in FIG. 1, each LC pixel does not have an independently controlled horizontal electrode. Namely, the LC pixels contained in conditioning regions R1 and R2 of LC cavity 116 are both controlled by a single horizontal electrode, i.e., horizontal electrode 116A. Hence, the on/off state of the LC pixel in conditioning region R1 is identical to the on/off state of the LC pixel in conditioning region R2. As noted above, this is because the on/off state of an LC pixel depends on the potential difference between the two electrodes of the LC pixel, and in this embodiment the LC pixels in regions R1 and R2 share the same electrodes. Because the biasing scheme disclosed above in Table 1 allows LC beam-polarizing element 101 to perform switching and attenuation of input beam 120 with horizontal electrodes 115A and 116A set at the same fixed voltage, the configuration and fabrication of LC beam-polarizing element 101 may be simplified. Only two LC cavities and two horizontal electrodes are formed on the surface of transparent plate 112, even though LC beam-polarizing element 101 includes three conditioning regions. It is contemplated by embodiments of the invention that LC beam-polarizing element 101 may also include three separate LC cavities, each with a corresponding horizontal electrode. In such an embodiment, it is still true that only one control signal is necessary to perform 1×2 switching and attenuation on an input beam.

One of skill in the art will appreciate that the specific values disclosed in Table 1 for the biasing scheme for vertical control electrode 117 and horizontal electrodes 115A, 116A may be altered in embodiments of the invention. For example, because the behavior of LCs is a function of the potential difference between vertical control electrode 117 and horizontal electrodes 115A, 116A, it is contemplated that the bias on all electrodes may be increased or decreased the same amount without effecting the behavior of the LCs in conditioning regions R1, R2, and R3. Further, the range of potential difference between said electrodes need not be held to exactly −8 V to +8 V. Depending on what LC material is present in conditioning regions R1, R2, and R3, the potential differences disclosed in Table 1 may be altered in order to optimize the optical performance of said LC materials.

In optical communication systems that employ wavelength division multiplexing (WDM), information is carried by multiple channels, each channel having a unique wavelength. In such optical systems, switching and attenuation of WDM signals may be performed by a wavelength selective switch (WSS), which can selectively direct each of the wavelength channels of an input light beam to one of multiple output optical paths. For example, in a 1×4 WSS device, an input light beam containing a plurality of wavelength channels enters through an input fiber and each of the individual wavelength channels is directed to one of four output fibers. Embodiments of the invention contemplate the incorporation of an optical device substantially similar to optical device 100 into a WSS.

Figure 2:
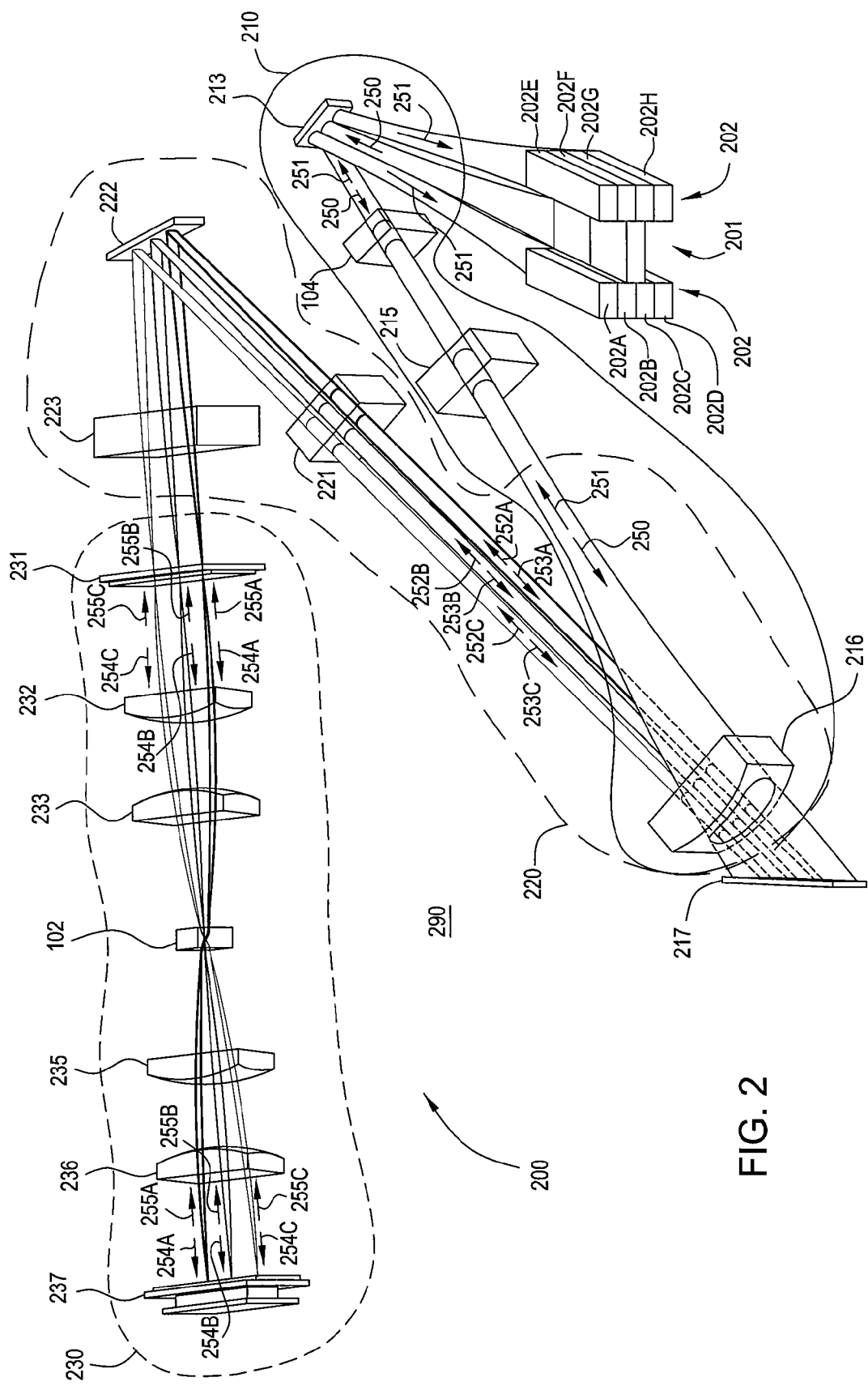
FIG. 2 is a perspective view of a wavelength selective switch that performs 1×4 switching and attenuation of a wavelength division multiplexed signal, according to an embodiment of the invention.

FIG. 2 is a perspective view of a WSS 200 that performs 1×4 switching and attenuation of a WDM signal, according to an embodiment of the invention. WSS 200 includes an LC-based optical switching device that is similar in organization and operation to optical device 100 in FIG. 1. The LC-based optical switching device provides selective 1×2 switching and attenuation of the wavelength channels contained in a WDM signal. Cascading the LC-based optical switching device with another 1×2 optical switching device provides 1×4 switching capability for WSS 200.

WSS 200 is a 1×4 WSS and includes an optical input port 201, an optical output port array 202, a first beam shaping/steering section 210, a diffraction grating 217, a second beam shaping/steering section 220, and a switching optics assembly 230. The components of WSS 200 are mounted on a planar surface 290 that is herein defined as the horizontal plane for purposes of description. In the example described herein, planar surface 290 is substantially parallel to the plane traveled by light beams interacting with WSS 200. Also for purposes of description, the configuration of WSS 200 described herein performs wavelength separation of a WDM signal in the horizontal plane and switching selection, i.e., channel routing, in the vertical plane.

For illustrative purposes, inbound light beams 250, 252A-C, 254A-C, and outbound light beams 251, 253A-C, 255A-C are shown in FIG. 2A to more clearly indicate the optical coupling of various elements of WSS 200. Because of the bi-directional nature of most components of WSS 200, light beams are directed along parallel inbound and outbound paths simultaneously between optical components of WSS 200. A number of the inbound and outbound paths are displaced from each other vertically by WSS 200, and this vertical displacement is further described below. For clarity, a single light beam is used in FIG. 2 to schematically represent both an inbound and outbound light beam between two optical components of WSS 200 rather than two beams that are vertically displaced with respect to one another. For example, inbound light beam 250 and outbound light beam 251 are schematically represented by a single light beam between folding mirror 213 and diffraction grating 217.

Optical input port 201 optically couples a WDM optical input signal (not shown) to WSS 200. Optical input port 201 may include birefringent crystals, linear polarizers, and/or other polarization optics configured to condition the WDM optical input signal to a known, linearly polarized state, e.g., s- or p-polarized. Optical output port array 202 is, in the configuration shown in FIG. 2, positioned proximate input port 201. Optical output port array 202 includes four vertically aligned optical output ports 202A-D and four vertically aligned loss ports 202E-H. Optical output ports 202A-D act as the optical output interface between WSS 200 and other components of a WDM optical communication system. Loss ports 202E-H serve as termini for light beams consisting of unwanted optical energy, such as light having incomplete conversion of its polarization state by the LC arrays of WSS 200 which would otherwise be directed to an output port.

First beam shaping/steering section 210 includes a folding mirror 213, first beam polarization separator 102, and cylindrical lenses 215 and 216. First beam shaping/steering section 210 optically couples diffraction grating 217 with optical input port 201 and optical output port array 202, and shapes inbound beam 250 and outbound beam 251. First beam shaping/steering section 210 is also configured to direct outbound beam 251 or each of its constituent wavelength channels to either loss ports 202E-H or to optical output ports 202A-D, depending on the polarization state of outbound beams 253A-C. In this way, high extinction ratio switching is realized between the four output ports, since the majority of unwanted optical energy is directed to loss ports 202E-H. Inbound beam 250 and outbound beam 251 each contain a plurality of wavelength channels that are multiplexed into a single, "white" beam.

First beam polarization separator 102 is configured to direct outbound beam 251, or the individual wavelength components thereof, along two different optical paths, depending on the polarization state of outbound beam 251 or its wavelength components. The two paths may be separated in the horizontal plane by an angular or translational offset. First beam polarization separator 102 is described above in more detail in conjunction with FIG. 1.

Cylindrical lens 215 vertically extends inbound beam 250, and cylindrical lens 216 horizontally extends inbound beam 250. Together, cylindrical lenses 215, 216 shape inbound beam 250 so that the beam is elliptical in cross-section when incident on diffraction grating 217, wherein the major axis of the ellipse is parallel with the horizontal plane.

Diffraction grating 217 is a vertically aligned reflective diffraction grating configured to spatially separate, or demultiplex, each wavelength channel of inbound beam 250 by directing each wavelength along a unique optical path. In so doing, diffraction grating 217 forms a plurality of inbound beams, wherein the number of inbound beams corresponds to the number of optical wavelength channels contained in inbound beam 250. In FIG. 2, diffraction grating 217 is shown to separate inbound beam 250 into three inbound beams 252A-C. However, in practice, the number of optical channels contained in inbound beam 250 may be up to 50 or more. Because the separation of wavelength channels by diffraction grating 217 takes place horizontally in the configuration shown in FIG. 2, spectral resolution is enhanced by widening inbound beam 250 in the horizontal plane, as performed by cylindrical lens 216. Diffraction grating 217 also performs wavelength channel combination, referred to as multiplexing, of outbound beams 253A-C into outbound beam 251.

Second beam shaping/steering section 220 includes a folding mirror 222, cylindrical lenses 216, 221, and a focusing lens 223. Second beam shaping/steering section 220 optically couples diffraction grating 217 with switching optics assembly 230, shapes inbound beams 252A-C and outbound beams 253A-C, and focuses inbound beams 252A-C on the first element of switching optics assembly 230, i.e., beam polarization unit 231.

Switching optics assembly 230 includes beam polarization unit 231, collimating lenses 232, 233, second beam polarization separator 104, collimating lenses 235, 236, and a 1×2 optical switching device 237. The elements of switching optics assembly 230 are optically linked to enable the optical routing of a WDM input signal entering optical input port 201 to any one of the optical output ports 202A-D or loss ports 202E-H. The optical routing is performed by conditioning (via LC polarization) and vertically displacing inbound beams 252A-C to produce outbound beams 253A-C. Switching optics assembly 230 selectively determines the vertical displacement of each outbound beams 253A-C to correspond to the vertical position of the desired output port, i.e., optical output port 202A, 202B, 202C, or 202D, hence performing a 1×4 optical switching operation. The selective vertical displacement of inbound beams 252A-C by switching optics assembly 230 is described below in conjunction with FIG. 2C. In addition, switching optics assembly 230 conditions each of inbound beams 252A-C to attenuate each beam as desired. This additional conditioning is also described below in conjunction with FIG. 2C.

Figure 4:
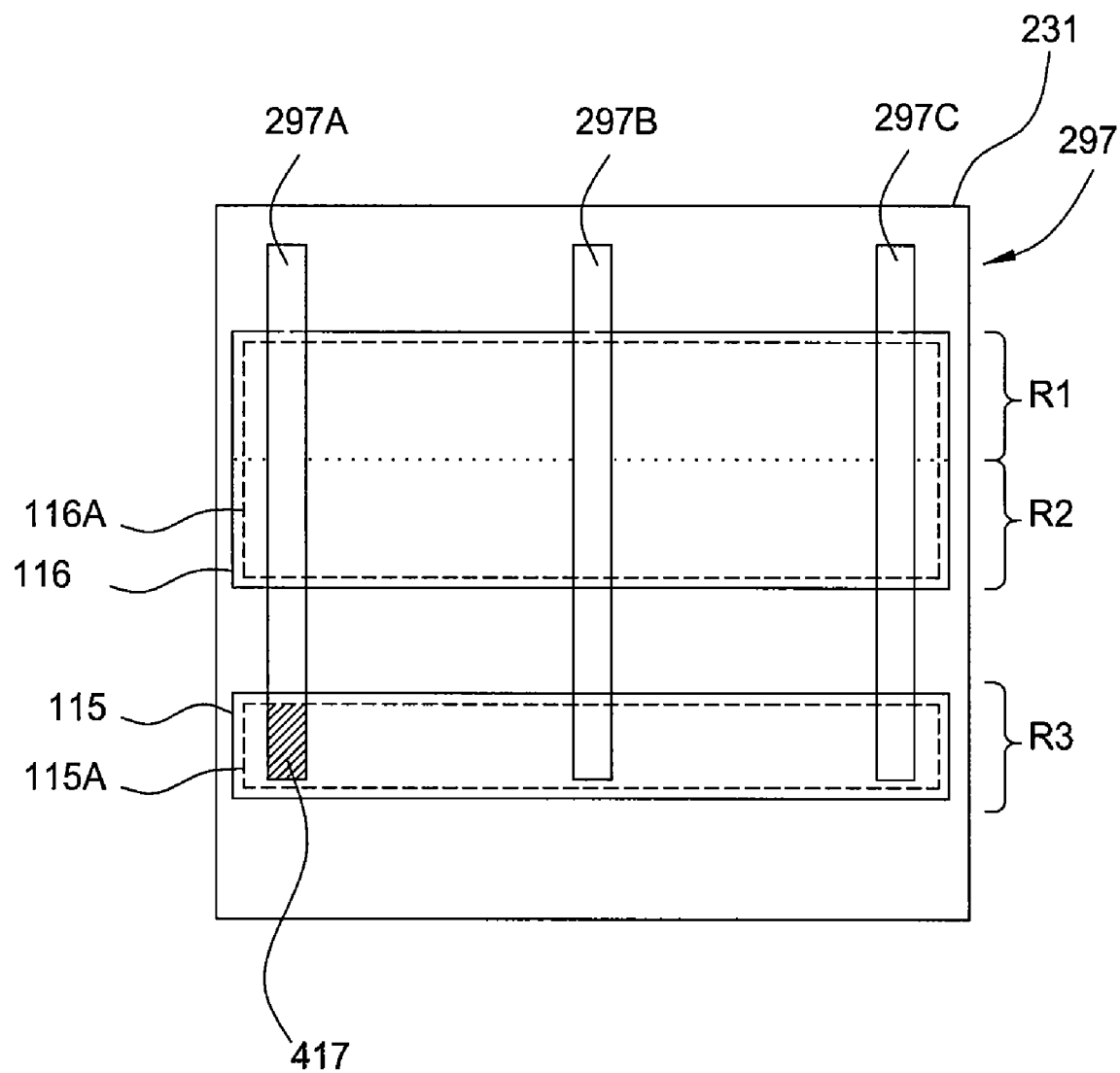
FIG. 4 schematically illustrates a cross-sectional view of a beam polarization unit taken at section line A-A, as indicated in FIG. 3.

Beam polarization unit 231 is similar in organization and operation to LC beam-polarizing element 101 in FIG. 1, except modified to condition a plurality of horizontally displaced wavelength channels, i.e., beams 252A-C and outbound beams 255A-C. To that end, beam polarization unit 231 includes a vertical electrode array 297 of vertical control electrodes 297A-C, pictured in FIG. 4, which together with horizontal electrodes 115A and 116A are configured to condition the polarization of each of inbound beams 252A-C and produce inbound beams 254A-C. Beam polarization unit 231 is also configured to condition the polarization state of outbound beams 255A-C so that each beam, and therefore each wavelength channel of outbound beam 251, may be independently attenuated or directed to one of loss ports 202E-H. One configuration of horizontal electrodes 115A and 116A and vertical control electrodes 297A-C is depicted in FIG. 4.

Collimating lenses 232, 233 are spherical lenses and are configured to direct and focus inbound beams 254A-C onto second beam polarization separator 104, and to direct and focus outbound beams 255A-C onto beam polarization unit 231. In the example illustrated in FIG. 2, two collimating lenses are shown. In other configurations, the function of collimating lenses 232, 233 may be combined into a single lens, or three or more lenses may be used.

Second beam polarization separator 104 is configured to direct inbound beams 254A-C along two different optical paths, i.e., an upper and a lower path, depending on the polarization state of the beams. The polarization state of inbound beams 254A-C is determined by the polarization conditioning performed by beam polarization unit 231, where the polarization conditioning is similar in operation to LC beam-polarizing element 101 in FIG. 1. The two optical paths are separated in the vertical direction either angularly or by a translational offset. In either case, the vertical offset between the two possible paths for inbound beams 254A-C indicates that inbound beams 254A-C may be directed to either an upper or lower region of 1×2 optical switching device 237. Second beam polarization separator 104 is also configured to direct outbound beams 255A-C back through beam polarization unit 231. Similar to first beam polarization separator 102, second beam polarization separator 104 may be a Wollaston prism or a birefringent crystal. In contrast to first beam polarization separator 102, second beam polarization separator 104 is oriented to impart an angular or translational deflection to beams in the vertical direction, rather than the horizontal direction, as part of the 1×4 switching of wavelength channels in the vertical plane.

Collimating lenses 235, 236 are spherical lenses and are configured to direct and focus inbound beams 254A-C from second beam polarization separator 104 onto 1×2 optical switching device 237. When bound beams 254A-C travel along an upper optical path as directed by second beam polarization separator 104, collimating lenses 235, 236 direct and focus the beams onto an upper region of 1×2 optical switching device 237. On the other hand, when inbound beams 254A-C travel along a lower optical path as directed by second beam polarization separator 104, collimating lenses 235, 236 direct and focus the beams onto a lower region of 1×2 optical switching device 237. Collimating lenses 235, 236 are also configured to direct outbound beams 255A-C from 1×2 optical switching device 237 to second beam polarization separator 104. In the example illustrated in FIG. 2, two collimating lenses 235, 236 are shown. In other configurations, one collimating lens or more than two lenses may perform the function of collimating lenses 235, 236.

1×2 optical switching device 237 is configured to perform 1×2 switching, 90° rotation of polarization, and redirection of inbound beams 254A-C, thereby producing outbound beams 255A-C. 1×2 optical switching device 237 includes quarter wave plate 103A to rotate the polarization of inbound beams 254A-C. 1×2 optical switching device 237 also includes a 1×2 optical switch, such as an LC-based switch or a MEMS-based switch. 1×2 optical switching device 237 is configured to direct each incident beam, i.e., inbound beams 254A-C, along two different parallel optical paths, separated by a vertical offset. Since each of inbound beams 254A-C may be directed to 1×2 optical switching device 237 along two possible sets of optical paths from second beam polarization separator 104, i.e., an upper path or lower path, outbound beams 255A-C may be directed from 1×2 optical switching device 237 along any of four vertically displaced optical path sets, which are represented by outgoing beams 420A-D in FIG. 3.

Figure 3:
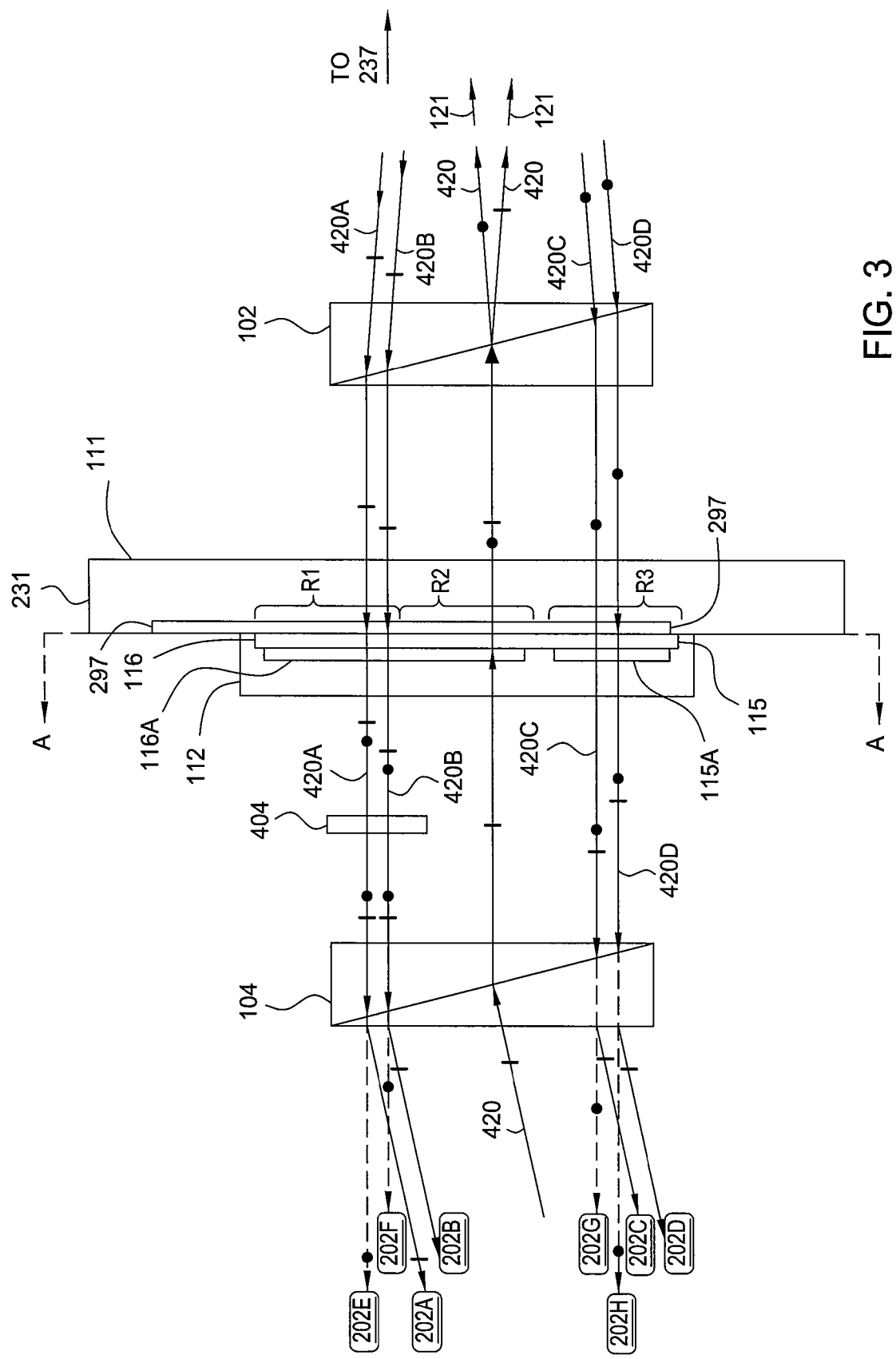
FIG. 3 schematically illustrates a cross sectional view of a beam polarization unit, which, according to one embodiment of the invention, is contained in a switching optics assembly.

FIG. 3 schematically illustrates a cross sectional view of beam polarization unit 231, which is contained in switching optics assembly 230. Also depicted in FIG. 2C are first beam polarization separator 102 and second beam polarization separator 104. Taken together, beam polarization unit 231, first beam polarization separator 102, second beam polarization separator 104, and 1×2 optical switching device 237 (not shown in FIG. 2C) provide 1×4 switching and attenuation of beam 420 between optical output ports 202A-D and/or loss ports 202E-H. Beam polarization unit 231, first beam polarization separator 102, second beam polarization separator 104, and 1×2 optical switching device 237 perform switching and attenuation in a manner substantially similar to optical switching device 100 in FIG. 1, except for a plurality of input beams, rather than for a single input beam. In FIG. 3, cylindrical lenses, focusing lenses, and other optical components of WSS 200 are omitted for clarity.

FIG. 4 schematically illustrates a cross-sectional view of beam polarization unit 231 taken at section line A-A, as indicated in FIG. 3. Vertical electrode array 297 is positioned adjacent LC cavities 115, 116, as shown in FIG. 3. Vertical electrode array 297 includes a plurality of vertical control electrodes 297A-C, which are each substantially similar in configuration to vertical control electrode 117 in FIG. 1. Each of vertical control electrodes 297A-C corresponds to one of the wavelength channels into which an optical input beam is divided prior to processing by beam polarization unit 231, and each vertical electrode is positioned appropriately so that the desired wavelength channel is incident on the requisite vertical electrode. For clarity, vertical electrodes for only three channels are illustrated in FIG. 4. Vertical electrode arrays configured for 50 or more wavelength channels are also contemplated. Horizontal electrodes 115A, 116A act as common electrodes for all wavelength channels that pass through beam polarization unit 231.

Referring back to FIG. 3, beam polarization unit 231 conditions the polarization state of beam 420 and outgoing beams 420A-D, and beam steering units 214, 234 direct beam 420 and outgoing beams 420A-D along different vertically displaced optical paths based on the polarization state of each beam. Beam 420 corresponds to an individual wavelength channel that is routed by switching optics assembly 230, i.e., any of inbound beams 252A-C. Using the same electrode-biasing scheme described in detail above in conjunction with Table 1, beam polarization unit 231, first beam polarization separator 102, second beam polarization separator 104, and 1×2 optical switching device 237 provide 1×4 switching and attenuation of beam 420.

In the example illustrated in FIG. 3, a quarter wave plate 404 is positioned between beam polarization unit 231 and first beam polarization separator 102 to rotate the polarization of outgoing beams 420A, 420B by 90°. With this configuration, all light beams directed to optical output ports 202A-D, i.e., output signals, consist entirely of p-polarized light and all light beams directed to loss ports 202E-H, i.e., unwanted optical energy, consist entirely of s-polarized light. Because first beam polarization separator 102 directs all p-polarized light in a first horizontal direction and all s-polarized light in a second horizontal direction, positioning quarter wave plate 404 as shown in FIG. 2C allows optical output ports 202A-D to be horizontally displaced from loss ports 202E-H and to be configured in a vertically aligned array, such as optical output port array 202 of WSS 200. Alternatively, beam polarization unit 231 may not include quarter wave plate 404. In this case, optical output ports 202A-D are not positioned in a vertically aligned array, and instead are grouped into two horizontally displaced pairs. The functionality of WSS 200 is not affected when optical output ports 202A-D are not grouped in a vertical array.

In sum, WSS 200 is an optical switching device that is capable of both WDM signal routing and wavelength independent attenuation, so that the individual channels contained in a WDM signal can be equalized by the same optical switching device that performs 1×2 switching of the wavelength channels using a single independent control for both functions, thereby simplifying the fabrication, alignment, and control of the optical switching device.

While the foregoing is directed to embodiments of the present invention, other and further embodiments of the invention may be devised without departing from the basic scope thereof, and the scope thereof is determined by the claims that follow.

We claim:

1. An optical device configured to perform switching and attenuation of an input beam, comprising:
   a liquid crystal (LC) structure for conditioning the polarization state of incident light and disposed in an optical path of an input beam and optical paths of output beams generated from the input beam, the LC structure having,
      a first light-conditioning LC region positioned in the optical path of the input beam,
      a second light-conditioning LC region positioned in an optical path of a first output beam,
      a third light-conditioning LC region positioned in an optical path of a second output beam, and
      a control electrode that is controlled to be set at one of multiple bias levels and is arranged to simultaneously apply the same bias to the first, second and third light-conditioning LC regions;
   a first electrode that is arranged to apply a first fixed reference bias to the first and second light-conditioning LC regions;
   a second electrode that is arranged to apply a second fixed reference bias to the third light-conditioning LC region; and
   a beam polarization separator disposed in the optical path of the input beam and configured to generate the output beams from the input beam based on a polarization state of the input beam.

2. The optical device of claim 1, further comprising a light-reflective element arranged in the optical paths of the output beams to redirect the first and second output beams through the second and third light-conditioning LC regions, respectively.

3. The optical device of claim 2, further comprising an optical element arranged in the optical paths of the output beams downstream of the second and third light-conditioning LC regions and configured to reduce an intensity of the output beams passing therethrough in accordance with the polarization state of the output beams.

4. The optical device of claim 3, wherein the optical element comprises a beam polarization separator that splits each of the first and second output beams into an s-polarized component and a p-polarized component and directs the p- and s-polarized components of the first and second output beams along different optical paths.

5. The optical device of claim 3, wherein the optical element comprises an absorptive polarizer that absorbs one of p- and s-polarized components of the output beams.

6. The optical device of claim 2, wherein the light-reflective element comprises a reflective surface and a quarter-wave plate.

7. The optical device of claim 1, wherein the first and second light-conditioning LC regions are formed from a single liquid crystal cavity.

8. In an optical device having at least one input port, multiple output ports, multiple loss ports, and a liquid crystal (LC) structure having first, second and third light-conditioning LC regions for conditioning the polarization state of incident light and a control electrode that is controlled to be set at one of multiple bias levels and is arranged to simultaneously apply the same bias to each of the light-conditioning LC regions, and a first electrode that is arranged to apply a first fixed reference bias to the first and second light-conditioning LC regions, a second electrode that is arranged to apply a second fixed reference bias to the third light-conditioning LC region, a method for switching an input beam to an output port and attenuating the input beam using said LC structure, said method comprising the steps of:
   controlling the control electrode as the first electrode applies the first fixed reference bias and the second electrode applies the second fixed reference bias;
   passing the input beam through said second light-conditioning LC region of the LC structure and changing a polarization state of the input beam;
   directing a primary component of the input beam along a first optical path and a residual component of the input beam along a second optical path based on the polarization state of the input beam;
   passing the primary component of the input beam through said first light-conditioning LC regions of the LC structure and changing a polarization state of the primary component; and
   directing a first component of the primary component to an output port, wherein the first component of the primary component has a lower intensity than the primary component.

9. The method of claim 8, further comprising:
   passing the primary component of the input beam through a beam polarization separator that separates the primary component into the first component and a second component that is directed to a loss port.

10. The method of claim 8, further comprising:
passing the primary component of the input beam through an absorptive polarizer that allows the first component of the primary component to pass through but absorbs a second component of the primary component.

11. The method of claim 8, further comprising:
passing the residual component of the input beam through said third light-conditioning LC regions of the LC structure and changing a polarization state of the residual component; and
directing a first component of the residual component to an output port, wherein the first component of the residual component has a lower intensity than the residual component.

12. The method of claim 11, further comprising:
passing the residual component of the input beam through a beam polarization separator that separates the residual component into the first component and a second component that is directed to a loss port.

13. The method of claim 11, further comprising:
passing the residual component of the input beam through an absorptive polarizer that allows the first component of the residual component to pass through but absorbs a second component of the residual component.

14. The method according to claim 8, wherein the input beam is separated into the primary component and the residual component using a birefringent crystal.

\* \* \* \* \*

UNITED STATES PATENT AND TRADEMARK OFFICE
CERTIFICATE OF CORRECTION

PATENT NO.         : 8,358,398 B2
APPLICATION NO.    : 12/356038
DATED              : January 22, 2013
INVENTOR(S)        : Xuehua Wu et al.

It is certified that error appears in the above-identified patent and that said Letters Patent is hereby corrected as shown below:

On the Title page, under "Related U.S. Application Data" (Item 63), after "filed on Jan. 15, 2008", insert --now issued patent number 8,203,691--.

Signed and Sealed this
Twentieth Day of August, 2013

Teresa Stanek Rea
*Acting Director of the United States Patent and Trademark Office*